United States Patent [19]

Jacques

[11] 4,190,168
[45] Feb. 26, 1980

[54] LABEL FOR RETURNABLE AND REFILLABLE BOTTLE AND ASSOCIATED METHOD

[76] Inventor: Pierre Jacques, 10 Captor Ct., Huntington, N.Y. 11743

[21] Appl. No.: 972,396

[22] Filed: Dec. 22, 1978

[51] Int. Cl.² .............................................. B65D 23/08
[52] U.S. Cl. .................... 215/12 R; 156/86; 428/35; 428/36
[58] Field of Search ............... 215/12 R, 365, DIG. 6; 40/310, 306; 428/35, 36, 212; 156/86

[56] References Cited

U.S. PATENT DOCUMENTS

| | | | |
|---|---|---|---|
| 3,542,229 | 11/1970 | Beyerlein | 215/12 R X |
| 3,604,584 | 9/1971 | Shank | 215/12 R |
| 3,912,100 | 10/1975 | Graham | 215/12 R |
| 4,038,446 | 7/1977 | Rhoads | 215/12 R |
| 4,053,076 | 10/1977 | Vogel | 215/12 R |

*Primary Examiner*—Donald F. Norton
*Attorney, Agent, or Firm*—Posnack, Roberts, Cohen & Spiecens

[57] ABSTRACT

A label is provided for a bottle in the form of a heat shrinkable sleeve made of oriented polyethylene. The label is made as a laminate having inner and outer layers. The outer layer has a coefficient of friction of less than about 0.15. The inner layer has a coefficient of friction of greater than about 0.4. The inner layer includes ethylene vinyl acetate. The layers are about 0.001 inches. The layers are connected by an adhesive, which is about 0.00005 inches thick. A plurality of sleeves can be formed from a planar strip wherein first halves of the sleeves are formed adjacent each other along half of the strip and complementary halves of the sleeves are formed adjacent each other along the other half of the strip, whereafter the strip is folded in half to bring the first halves into alignment with the complementary halves and the thusly constituted portions of the sleeves are heat sealed or welded together.

30 Claims, 5 Drawing Figures

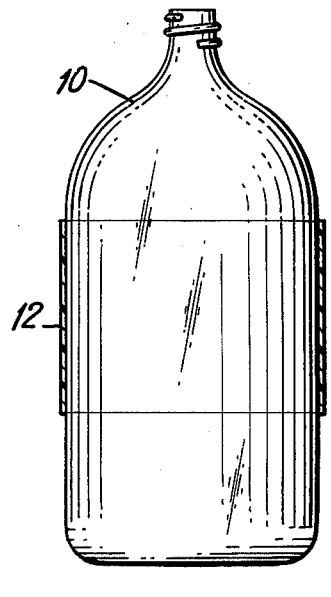 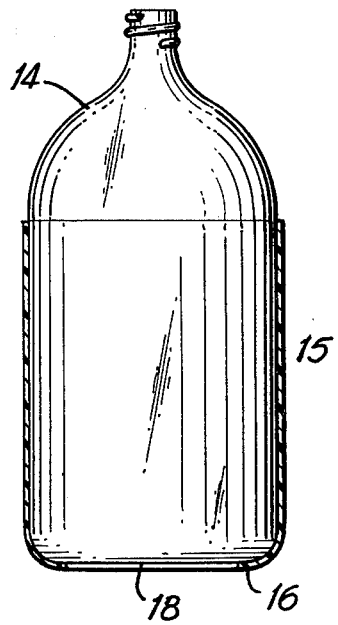 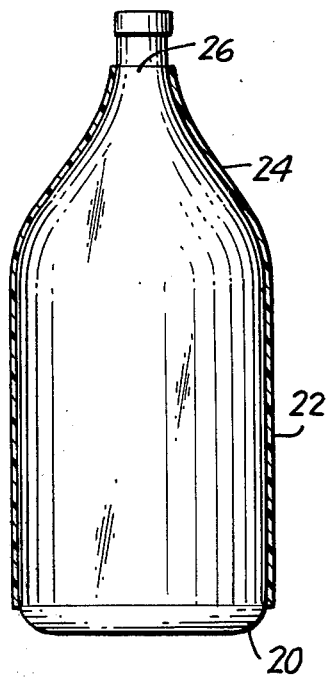
FIG.1   FIG.2   FIG.3
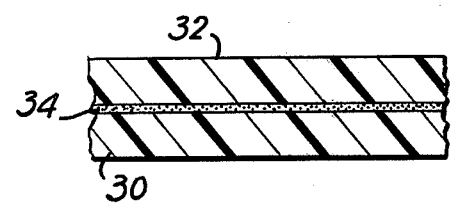
FIG.4
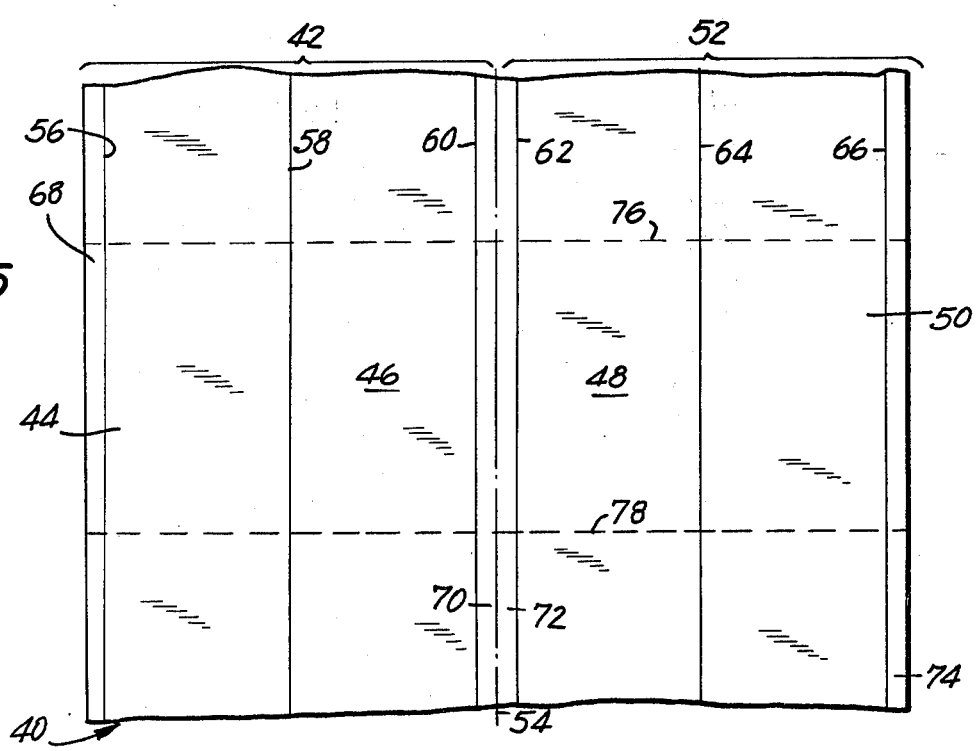
FIG.5

LABEL FOR RETURNABLE AND REFILLABLE BOTTLE AND ASSOCIATED METHOD

BACKGROUND

At present, the principle identification technique in the returnable and refillable bottle market is by applied color label, also known as ACL. This technique employs a screen-applied colored ceramic frit fused permanently to the surface of the glass in one or more colors on the body and/or neck of the container. The ACL is applied by the glass manufacturer, thus eliminating the need for in-line labeling equipment or costly paper label removing equipment at developer locations. Although the graphics that can be achieved within the restrictions of the ACL process are limited to relatively simple line work, the results have been generally acceptable to the bottling industry. ACL treated glass bottles represent a relatively high initial cost. This cost can be justified when cycle time, trippage, sorting and cleaning costs are acceptable to the individual developer.

Recently, changes have taken place in equipment, in glass pricing and in other areas that have created a need for a system to replace ACL returnable and refillable bottles. Developments have taken place with plastic labels and with heat shrinkable sleeves which might lead in the direction of suitable replacements for ACL.

The Shank U.S. Pat. No. 3,604,584 reveals a method for protecting jars and bottles from abrasion by heat shrinking a thermoplastic material around a portion of the glass article. Thus, for example, a protective sheet or tube made from a thermocontractive polyvinyl chloride film having a thickness of about 3 mils. can be used. The diameter of the sheet is slightly greater than the diameter of the bottle so that the tube can be easily slid over the bottle but when shrunk, will tightly encircle the bottle. The shrinkage can be effected by immersing the tube and bottle in a bath of water which is heated to approximately 180° F.

The Beyerlein U.S. Pat. No. 3,542,229 deals with a plastic bottle having a shrunk stregthening band. The bursting strength of a bottle of, for example, thermoplastic material is increased by applying about the body of the bottle a shrunk-on band of stretchable heat shrinkable plastic film which is under tensile stress and prestresses the bottle body. The stretched band is specifically made of polyvinyl chloride which makes it possible to transfer the advantages of high creep rupture strength to the bottle which is involved. This patent also discloses that it is possible to print on the inner side of the band which is transparent and that the body of the bottle itself may also be printed upon since the band will protect the printing from scratching or other damage.

SUMMARY OF INVENTION

It is an object of the invention to provide an improved label or sleeve for a glass bottle or the like which will stand the abuse of washing and, therefore, constitute a label or sleeve for a returnable and refillable bottle or other such container.

It is another object of the invention to provide an improved label for a returnable and fillable bottle specifically suitable for and adapted to labeling requirements established by F.D.A. such as for sodas containing saccharin and the like.

It is another object of the invention to provide an improved label suitable for use on returnable and refillable bottles and adapted to replace statements of currently stipulated and instituted deposit laws which have been printed on bottles and especially suited therefor by being removable from the container with which it is associated and replaced in the event that such deposit laws are changed.

Yet another object of the invention is to provide an improved label suitable for bearing intelligence and protecting the same by having the intelligence located thereon in the form of ink encapsulated between two layers of plastic in sleeve form which can be slipped over a bottle and subjected to heat shrinking thereon.

Still another object of the invention is to provide an improved label especially suitable for withstanding a hot caustic wash such as employed in connection with returnable and refillable bottles and especially adapted for withstanding such hot caustic wash after having been positioned a bottle.

Yet another object of the invention is to provide an improved label capable of multiple trips through washing cycles and the like while retaining suitable appearance and shape whereby repeated use is possible.

Still another object of the invention is to achieve the aforegoing and other results of the invention within an economic framework which is suitable for mass production bottling techniques.

Another object of the invention is to provide an improved sleeve which is well suited for retaining its position on a bottle.

Still another object of the invention is to provide an improved sleeve which is especially characterized by resistance to abrasion.

In achieving the above and other objects of the invention, there is provided a covering for a container, said covering comprising inner and outer layers, and means connecting said layers in laminate form, said outer layer having a greater degree of slip than said inner layer. Said laminate is preferably provided in the form of a sleeve and said layers are preferably of a heat shrinkable material. Said means is preferably an adhesive.

In accordance with a preferred embodiment of the invention, said layers are of oriented polyethylene. The outer layer will preferably in accordance with a feature of the invention have a coefficient of friction of less than about 0.15. Said inner layer in accordance with a feature of the invention will preferably have a coefficient of friction of greater than about 0.4.

To provide for the aforesaid relative degrees of slip, the inner layer will include, for example, ethylene vinyl acetate. Said layers will have a thickness of, for example, about 0.001 inches with the adhesive therebetween having a thickness of 0.00005 inches. According to the invention, there is furthermore provided a method. This method is a method of making a covering for a bottle and it comprises fabricating a sleeve of heat shrinkable material and forming the sleeve with a greater degree of slip in the outer portion thereof than in the inner portion thereof and with a greater circumference than the bottle, and then heat shrinking the sleeve onto the bottle.

The method will, furthermore, comprise forming the sleeve of inner and outer layers of oriented polyethylene and adding ethylene vinyl acetate to the material of the inner layer. The sleeve may initially be formed with a plane shape and then be welded or heat sealed into cylindrical form.

According to a particular form of the method of the invention, there is provided the method steps constituted by forming a plurality of sleeves from a strip wherein first halves of the sleeves are formed adjacent each other along half of the strip and complementary halves of the sleeves are formed adjacent each other along the other half of the strip, the strip being folded in half to bring the first halves into alignment with the complementary halves and the thusly aligned halves being welded or heat sealed together.

In accordance with another aspect of the invention, one of the layers may be surface printed with ink displaying various forms of intelligence and the adhesive mentioned above may be applied over the ink and then used to laminate the layers together.

Other objects, features and advantages of the invention will be found in the detailed description which follows hereinafter as illustrated in the accompanying drawing.

BRIEF DESCRIPTION OF DRAWING

In the drawing:

FIG. 1 diagrammatically illustrates a bottle with a sleeve thereon in accordance with the invention, the sleeve being shown in sections;

FIG. 2 illustrates a variation of the sleeve arrangement of FIG. 1;

FIG. 3 illustrates still another variation of the sleeve arrangement of FIG. 1;

FIG. 4 is a detailed cross-sectional view through the sleeve provided in accordance with a preferred embodiment of the invention; and FIG. 5 illustrates a preferred manufacturing technique employed to supply the sleeves of FIGS. 1-4.

DETAILED DESCRIPTION

Developmental work which has been done on sleeves for bottles and like containers reveals that, while strength improvement characteristics of sleeves for bottles is important, there are also many other characteristics which are essential to a marketable sleeve and/or label. It has been found, for example, that single unlaminated webs of polyvinyl chloride are unsatisfactory since when they are passed through caustic paths, holes appear therein which are unsatisfactory for the end use. Other materials which I have attempted to use have not been abrasion or scuff resistant and, therefore, appeared unsightly after relatively short useage. In connection with yet other materials, the sleeves could not undergo abuse and did not remain tightly on the bottles to which they were affixed. This resulted in detachment of the sleeves or in some instances, bubbles under the sleeves which were found to be unacceptable. Other labels or sleeves wrinkled badly when subjected to abuse and, consequently, revealed the need for substantial approvement in this technical area.

In the testing of sleeves of the invention, the object was to determine whether or not all plastic laminations could withstand ten cycles through a returnable soaker rinser. The conditions within the soaker rinser included the use of a caustic solution at 150° F. A dwell time of 19 minutes representative of a commercial application was employed.

The labels or sleeves provided in accordance with the invention for returnable and refillable glass bottles have successfully withstood ten washings of the above-indicated type in a bottling plant. These sleeves or labels showed the ability to withstand fragment shattering upon breakage under pressure of the associated bottles. However, not only did the safety feature of the bottles show improvement but, moreover, the labels and sleeves of the invention which strongly resisted abrasion and, as well, showed a remarkable improvement in ability to maintain position on the container to which applied.

The research associated with the invention has indicated that a highly oriented polyethylene will shrink onto a bottle with efficiency and effectiveness. Moreover, it has been found that use of a high slip polyethylene for the outer layer of the laminant constituting the sleeve is essential, while a lesser degree of slip or a higher coefficient of friction for the inner layer is likewise essential.

Preferably, a special poly is used with minimum orientation in the transverse direction and maximum degree or percentage in the machine direction (the direction in which the film is extruded) so that the ultimate lamination will heat react and cling tightly to the bottle or container. This is done by controlling the "flow up ratio".

The slip in the outer layer eliminates scratching and marring of the label thereby rendering the same abrasion resistant. The slip of poly film is increased by the addition of a stearate or other fatty acid to induce a slipping surface. The material blooms to the surface after manufacture and acts as a lubricant against other films or articles. The inside layer must firmly grip onto the bottle to which applied. This has been achieved by the utilization of ethylene vinyl acetate which causes the inner layer to firmly grip onto the bottle to which the sleeve is applied.

As has been indicated above, the sleeve of the invention is supplied in the form of a laminate, the layers of which are bonded together by an adhesive. The adhesive employed is a curing adhesive which once cured will not allow delamination during the heat and caustic wash of the rinse and soak cycle. In relation to the curing of the adhesive, it is desirable to allow a 3 day cure before further processing the lamination into tubes or sleeves. This insures complete fusion of the layers and results in a lamination that will not be attacked by the heat, water or caustic of the wash cycles.

In accordance with the invention, inks may be applied to convey intelligence on the labels and/or sleeves of the invention. The inks which are employed are preferably heat resistant polyamid inks. These were employed so that no change of color would be evident after many washings. Moreover, the inks are employed in surface printing one of the layers of the laminate of the invention whereafter the ink applied is covered by the aforementioned adhesive which is then employed in bonding the layers of laminate together.

Referring next to FIG. 1, therein is seen a bottle 10 fabricated of glass and encircled by a sleeve 12 of the invention. As will be shown hereinafter, the sleeve 12 is a lamination of layers of polyethylene having specific characteristics and formed particularly of oriented polyethylene. The sleeve is originally formed with a diameter or circumference greater than the corresponding dimensions of the bottle 10 upon which the sleeve is ultimately heat shrunk by being placed in a hot water bath so that the sleeve contracts onto the bottle which is thereby placed under a compressive stress. The label being heat shrunk onto the bottle is thereby placed under tensile stress and operates to increase the bursting strength of the bottle. This being especially of interest where the bottle is used to contain carbonated beverages or the like, whereby the interior wall of the bottle is subjected to increased pressure.

FIG. 2 indicates a bottle 14 bearing a label 15 having the structural characteristics noted hereinabove but of a greater length and having an inturned end 16 cupping underneath the bottom 18 of the bottle and being therefore capable of withstanding greater axial stress tending to remove the sleeve from the bottle. At the same time, it will be noted that the sleeve or label covers a greater portion of the body of the bottle thereby protecting a greater area of the same from external abuse.

FIG. 3 illustrates a bottle 20 having a sleeve or label 22 thereon. The sleeve has an upper portion 24 fitting about the neck portion 26 of the bottle and thereby protecting the same.

FIG. 4 illustrates that the sleeve or label of the invention is a lamination constituted by a layer 30 and a layer 32 of oriented polyethylene which is shrinkable in response to the application of heat applied either by a hot water bath or by a heat gun. The layers 30 and 32 are connected together by an adhesive indicated at 34, this adhesive being adapted to withstand the abuses of a hot caustic wash such as is employed to wash bottles which are intended for being returnable and refillable.

In the lamination of FIG. 4 the polyethylene layers are preferably of a thickness of about 0.001 inches. The thickness of the adhesive is preferably in the order of 0.00005 inches.

For purposes of printing information on the label or sleeve of the invention, one of the faces of one of the layers may be treated such as, for example, by corona sparking or flaming to oxidize the same. The printing will be effected on the thusly treated side of the layer whereafter the adhesive will be applied over the ink to protect the same. The adhesive will then be employed to laminate the printed layer to the unprinted layer which may also be treated by flaming or with corona to provide for improved reception of the adhesive.

In the above, it has been generally indicated that the layers of the lamination of the invention are preferably fabricated of oriented polyethylene film. More specifically, one form which has been proved particularly suitable is the form prepared of oriented polyethylene film sold as Turex, Spec. No. 1048, for the outer layer. The inner layer may be fabricated from an oriented polyethylene film sold as Turex, Spec. No. 1050. The inner film is preferably prepared of an oriented polyethylene material including ethylene vinyl acetate. The purpose for this is to provide that the inner layer of the laminate has a lesser degree of slip than the outer layer.

More particularly, the layers are prepared so that the outer layer has a coefficient of friction of less than about 0.15 whereas the inner layer has a coefficient of friction of greater than about 0.4. This provides that the outer layer has sufficient slip to avoid the effects of abrasion thereby assuring that the label retains its appearance as well as a characteristic feature of tending to pass off abrasive forces tending to destroy the label and/or bottle. At the same time, the greater coefficient of friction of the inner layer as well as the utilization of the ethylene vinyl acetate provides for a superior grip of the inner layer on the bottle to which the sleeve is applied thereby providing the sleeve with a greater ability to maintain its position on the bottle so that repeated reuse of the bottle despite hot caustic washes is possible.

The adhesive of the novel laminate of the invention is preferably an adhesive sold under the designation Morton 333 or the equivalent thereof. As noted hereinabove, the adhesive is employed not only to bond the layers of the laminate together, but, as well, to protect the intelligence displaying ink surface printed onto one of the laminate layers.

According to the method of the invention, a covering for a bottle is made by fabricating a sleeve of heat shrinkable material and forming the sleeve with a greater degree of slip in the outer portion of the sleeve than in the inner portion thereof and with a greater circumference than the bottle. This enables the sleeve to be readily slipped over the bottle whereafter the sleeve is heat shrunk onto the bottle by the application of heat such as in a hot water bath or by a heat gun.

As illustrated more particularly in FIG. 5, the sleeve may be initially prepared in planar form and then welded or heat sealed into cylindrical form. In FIG. 5 is shown that a plurality of sleeves may be prepared from a strip such as indicated at 40. Therein, on one half of the strip indicated at 42, there are arranged a plurality of first halves 44 and 46 of respective sleeves, the complementary halves 48 and 50 for which are aligned on the half 52 of the strip. The strip can be folded along the center line 54 and the respective sleeves formed by welding at 56,58,60,62,64 and 66. The portions to be trimmed off are indicated at 68,70,72 and 74.

From what has been described above, it will be seen that the method of the invention comprises forming a plurality of sleeves from a strip wherein first halves of the sleeves are formed adjacent each other along half of the strip and complementary halves of the sleeves are formed adjacent each other along the other half of the strip. The strip is then folded in half to bring the first halves into alignement with the complementary halves and the thusly aligned halves are welded or heat sealed peripherally together.

There will also be observed in FIG. 5 the dotted lines 76 and 78 indicating cutting lines which delimit the lengths of the respective sleeves so that it will follow therefrom that a plurality of sleeve arrangements can be formed along an extended strip.

There will now be obvious to those skilled in the art many modifications and variations of the structures and methods set forth hereinabove. These modifications and variations will not depart from the scope of the invention if defined by the following claims.

What is claimed is:

1. A covering for a container comprising inner and outer layers, and means connecting said layers in laminate form, said outer layer having a greater degree of slip than said inner layer.

2. A covering as claimed in claim 1 wherein said laminate is in the form of a sleeve and said layers are of heat shrinkable material.

3. A covering as claimed in claim 2 wherein said means is an adhesive.

4. A covering as claimed in claim 3 wherein said layers are of oriented polyethylene.

5. A covering as claimed in claim 4 wherein said outer layer has a coefficient of friction of less than about 0.15.

6. A covering as claimed in claim 5 wherein said inner layer has a coefficient of friction of greater than about 0.4.

7. A covering as claimed in claim 5 wherein said inner layer has a coefficient of friction of greater than about 0.4.

8. A covering as claimed in claim 4 wherein the inner layer includes ethylene vinyl acetate.

9. A covering as claimed in claim 3 wherein said layers are of a thickness of about 0.001 inches.

10. A covering as claimed in claim 9 wherein the adhesive is about 0.00005 inches thick.

11. A covering as claimed in claim 1 wherein said layers are of oriented polyethylene.

12. A covering as claimed in claim 2 wherein said outer layer has a coefficient of friction of less than about 0.15.

13. A covering as claimed in claim 12 wherein said inner layer has a coefficient of friction of greater than about 0.4.

14. A covering as claimed in claim 2 wherein said inner layer has a coefficient of friction of greater than about 0.4.

15. A covering as claimed in claim 14 wherein the inner layer includes ethylene vinyl acetate.

16. An article of manufacture comprising a bottle and a stretched sleeve encircling and compressively engaging said bottle, said sleeve having inner and outer portions, said outer portion including a fatty acid and having a greater degree of slip than said inner portion.

17. An article of manufacture as claimed in claim 16 wherein said portions are inner and outer layers of heat shrinkable material and said sleeve includes an adhesive holding said layers together.

18. An article of manufacture as claimed in claim 17 wherein said layers are at least principally of expanded polyethylene having minimum orientation in transverse direction and maximum orientation perpendicularly thereto.

19. An article of manufacture as claimed in claim 18 wherein said inner layer has a coefficient of friction of greater than about 0.4.

20. An article of manufacture as claimed in claim 19 wherein said outer layer has a coefficient of friction of less than about 0.15.

21. An article of manufacture as claimed in claim 20 wherein said layers are about 0.001 inches thick.

22. An article of manufacture as claimed in claim 21 wherein said sleeve includes two circumferential sections seamed together.

23. An article of manufacture as claimed in claim 18 wherein said outer layer has a coefficient of friction of less than about 0.15.

24. An article of manufacture as claimed in claim 18 wherein said inner layer contains ethylene vinyl acetate.

25. An article of manufacture as claimed in claim 16 wherein said sleeve includes two circumferential sections seamed together.

26. A method of making a covering for a bottle comprising fabricating a sleeve of heat shrinkable material and forming the sleeve with a greater degree of slip in the outer portion of the sleeve than in the inner portion thereof and with a greater circumference than the bottle and heat shrinking the sleeve onto the bottle.

27. A method as claimed in claim 26 comprising forming the sleeve of inner and outer layers of oriented polyethylene and adding ethylene vinyl acetate to the material of the inner layer.

28. A method as claimed in claim 27 comprising forming the sleeve initially in planar form and then welding the same into cylindrical form.

29. A method as claimed in claim 28 comprising forming a plurality of sleeves from a strip wherein first halves of the sleeves are formed adjacent each other along half of the strip and complementary halves of the sleeves are formed adjacent each other along the other half of the strip, folding the strip in half to bring the first halves into alignment with the complementary halves, and welding the thusly aligned halves together.

30. A method as claimed in claim 27 comprising surface printing one of said layers with ink, applying said adhesive over the ink, and laminating the layers together through said ink, the adhesive being cured for about three days before the lamination.

* * * * *